(12) United States Patent
Jordan

(10) Patent No.: US 6,520,508 B1
(45) Date of Patent: Feb. 18, 2003

(54) KEYLESS ROUTER CHUCK

(75) Inventor: Paul T. Jordan, Caledonia, MI (US)

(73) Assignee: Jordan Manufacturing Solutions, Inc., Caledonia, MI (US)

( * ) Notice: Subject to any disclaimer, the term of this patent is extended or adjusted under 35 U.S.C. 154(b) by 216 days.

(21) Appl. No.: 09/651,418

(22) Filed: Aug. 30, 2000

Related U.S. Application Data

(60) Provisional application No. 60/151,712, filed on Aug. 31, 1999.

(51) Int. Cl.⁷ ............................................... B23B 31/20
(52) U.S. Cl. ........................... 279/46.7; 279/51; 279/54; 279/156
(58) Field of Search ............................... 279/46.7–46.9, 279/50, 51, 54, 55, 57, 58, 23.1, 28, 74, 33, 43–43.9, 46.1–46.6, 1.5–6

(56) References Cited

U.S. PATENT DOCUMENTS

| | | | | |
|---|---|---|---|---|
| 668,830 | A | * 2/1901 | Docharty et al. | ............. 279/28 |
| 859,976 | A | * 7/1907 | Procunier | ................... 279/46.7 |
| 2,172,070 | A | * 9/1939 | Palmgren | ..................... 279/74 |
| 2,374,245 | A | * 4/1945 | Stoner | ....................... 279/46.7 |
| 2,403,136 | A | * 7/1946 | Stoner | ....................... 279/46.7 |
| 2,432,350 | A | * 12/1947 | Stoner | ....................... 279/46.7 |
| 2,459,900 | A | * 1/1949 | Stoner | ....................... 279/46.7 |
| 2,465,837 | A | 3/1949 | Benjamin et al. | ............. 279/56 |
| 2,546,351 | A | * 3/1951 | Stoner | ......................... 279/33 |
| 2,584,303 | A | * 2/1952 | Stoner | ....................... 279/46.7 |
| 2,816,768 | A | * 12/1957 | Stoner et al. | ................. 279/50 |
| 3,610,641 | A | * 10/1971 | Ryder | ........................... 279/56 |
| 4,238,164 | A | * 12/1980 | Mazzolla | ................. 403/109.5 |
| 4,989,887 | A | 2/1991 | Jordan | ........................... 279/48 |
| 5,160,150 | A | 11/1992 | Schmidt | ....................... 279/58 |
| 5,215,317 | A | 6/1993 | Jordan et al. | .................. 279/63 |
| 5,382,030 | A | * 1/1995 | Kanaan | ....................... 279/46.7 |
| 5,495,425 | A | 2/1996 | Kanaan | ....................... 364/512 |
| 5,957,636 | A | 9/1999 | Boisvert | ..................... 409/131 |
| 6,062,574 | A | 5/2000 | Yorde | ........................... 279/49 |
| 6,079,917 | A | * 6/2000 | Miksa et al. | .................. 279/50 |

* cited by examiner

*Primary Examiner*—Steven C. Bishop
(74) *Attorney, Agent, or Firm*—Van Dyke, Gardner, Linn & Burkhart, LLP

(57) ABSTRACT

A tool receiver or chuck is provided which may receive a cutting tool, such as a router bit or the like, therewithin and non-rotatably retain the tool relative to a rotary driving device. The tool receiver includes a plurality of blades substantially encased within a conical surface. A biasing member biases the blades toward a narrow end of the conical surface such that the blades are biased in a tool engaging or operative position. The biasing member and conical surface thus bias the blades radially inward toward the cutting tool such that the blades engage the conical surface and the cutting tool. The tool receiver preferably includes a retaining member, which retains the blades within the conical surface and biases the blades radially outwardly toward the conical surface. The tool may be released by overcoming the biasing force of the biasing member by moving or sliding a retaining ring or by activating a lever or the like, such that no accessory wrenches or tools are required to insert or release a cutting tool or bit. Preferably, a width and radial length of the blades are dimensioned and/or the contact surfaces are defined to provide non-rotating engagement of the cutting tool by the blades, since the conical surface substantially limits twisting of the blades as the blades begin to rotate relative to the tool, thereby locking the tool relative to the blades. A ratio of the effective contact width of the blades to the radial length of the blades is preferably less than or equal to the coefficient of friction between each of the blades and the tool.

30 Claims, 6 Drawing Sheets

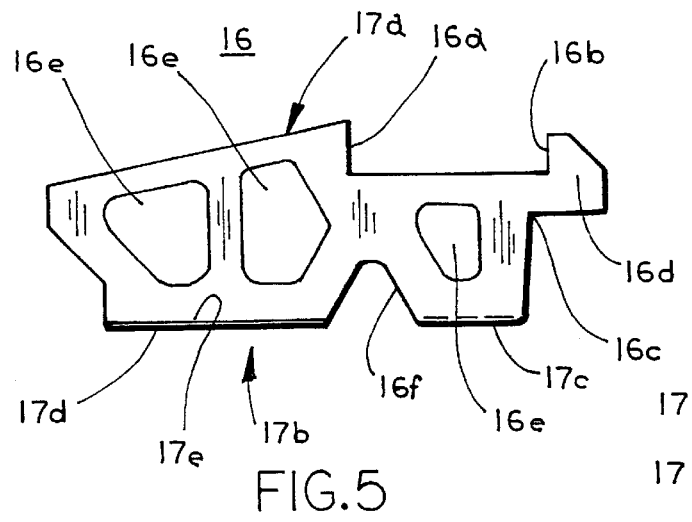
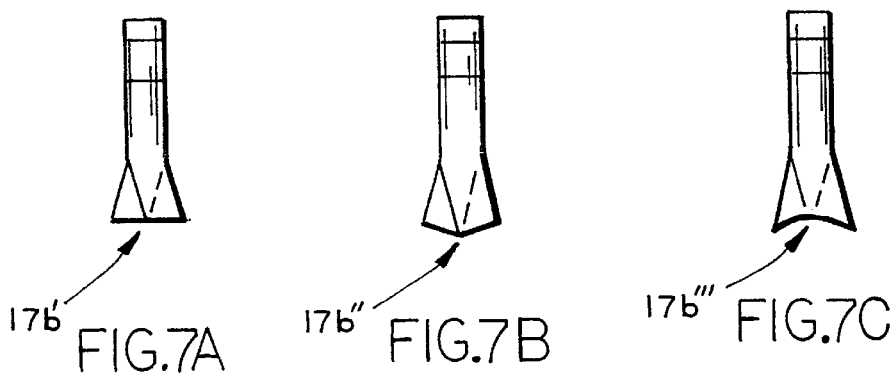
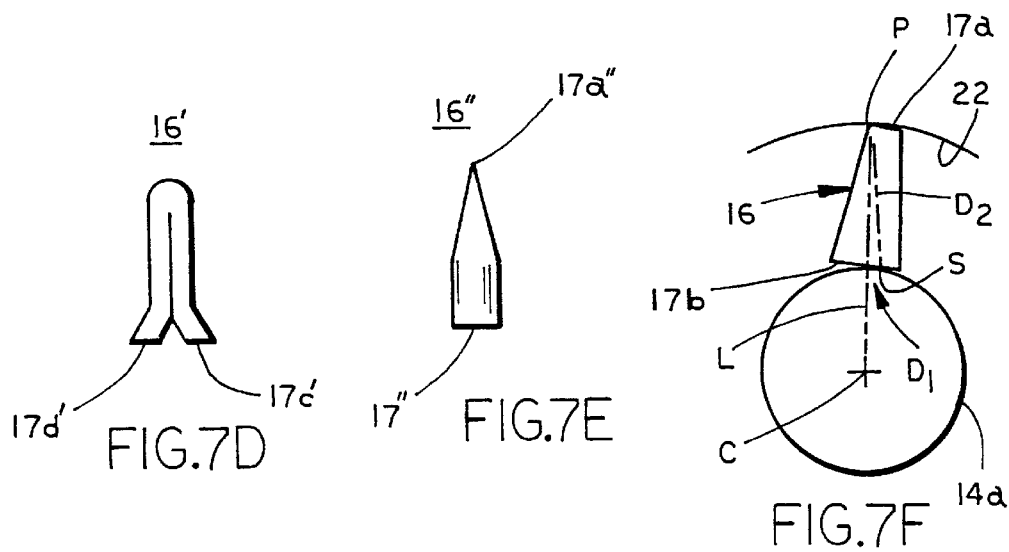

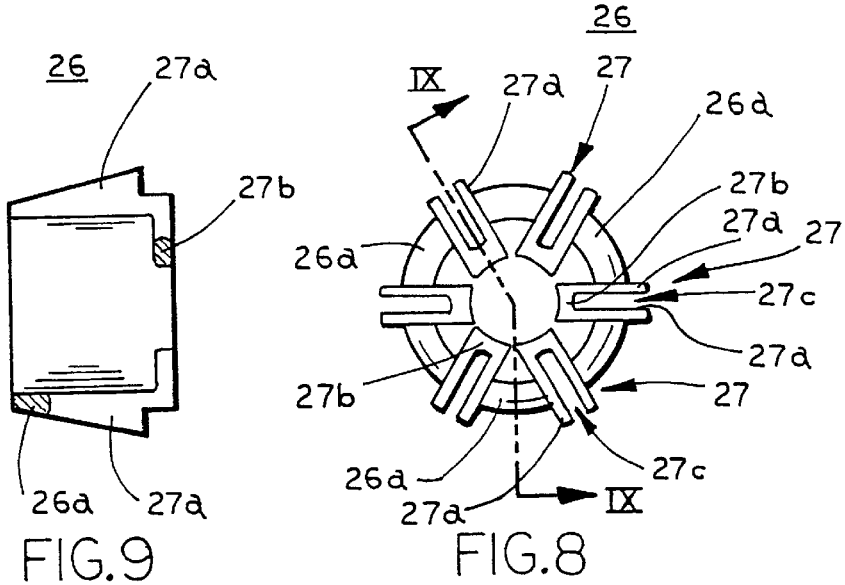
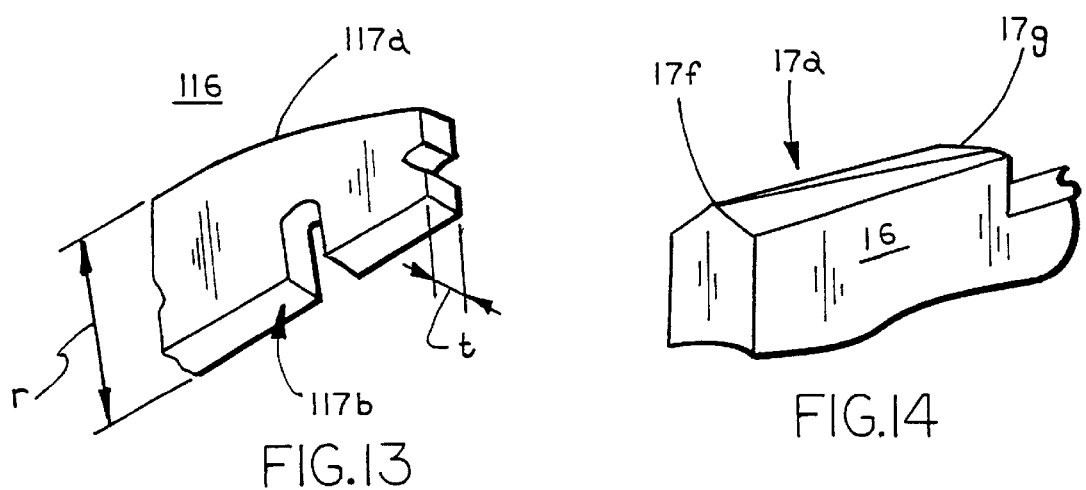

KEYLESS ROUTER CHUCK

This application claims benefit of U.S. Provisional Pat. Application, Ser. No. 60/151,712, filed Aug. 31, 1999, which is hereby incorporated in its entirety herein by reference.

BACKGROUND OF THE INVENTION

The present invention relates generally to drill or router chucks and, more particularly, to keyless router chucks.

Driving devices, such as drills or routers, include a tool retainer which non-rotatably secures a cutting tool, such as a drill bit or a router tool, to the driving device. Rotation of a drive shaft of the driving device then causes a corresponding rotation of the cutting tool. The clamping force of the retainer must provide sufficient gripping action of the tool. Otherwise, if the gripping friction force is overcome, the tool will slip in its holder, which may result in poor performance and hazard to those nearby.

Tool holding systems for woodworking, metalworking, and/or the like have been developed over many years. The most common types of tool holders that offer reasonable flexibility of gripping range are either collet systems or chucks. Common applications for portable electric drills incorporate keyless or keyed drill chucks. Within the metalworking trades such chucks are used for drills, while it is more common to see split steel collets for other applications such as milling or drilling where automated machinery is involved. These types of collets are in broad use today. However, such collets require a substantial amount of torque to be exerted on a threaded retainer in order to attain sufficient clamping force on the tool. This preloads the system such that the frictional engagement between the collet and the cutting tool limits rotational movement therebetween. In order to attain the high torque necessary to achieve the necessary clamping force, typically the user or operator uses wrenches or keys to rotate the threaded retainer, while holding the base or drive tool in a fixed position. Not only is this process cumbersome and sometimes difficult, this also results in the effective clamping forces being dependent on the torque applied by the individual operator, which will vary from one person to another.

In some applications, blade type flexible collet chucks are utilized, which have radial blades that are forced into contact with the cutting tool by the use of tapered cones and tightening nuts. Such collets are in use for light torque applications such as for tap holders and light machining, and are characterized by having substantially greater gripping ranges than the split steel types of collets. In most applications (except for keyless drill chucks), a tightening wrench or wrenches is necessary to cause the collet to grip the tool with sufficient force so that the friction between tool and collet is sufficient to resist the forces of the application.

Collet closers have been proposed which provide for the sufficient clamping force by means other than using tightening wrenches. The collet may be clamped via hand tightening of a threaded retainer on the driving device. However, these collet closers have a very narrow grip range and a wide force requirement to successfully grip over this range. Accordingly, these may be ineffective for tools having a diameter outside of the tight tolerance gripping range of the closers. Furthermore, these closers still require a high manual force to cause the collet to clamp onto the tool, which makes them difficult to use by an operator.

Existing collet systems of the split steel type and of the radial blade type typically match the outside shape of the collet system to that of the cone within which it is tightened. This approach is consistent with the desire to maintain wear resistance on the surfaces that grip the collet by providing large contact surfaces. In the case of the blade type collet chucks, the result of this design practice is to cause the blades to undergo a skewing tendency when the blade is in contact with the tool. This skewing action tends to negate the gripping force system of these designs because it forces the geometry into a violation of the design ratios necessary for the force system to work.

Therefore, there is a need in the art for a keyless chuck which may receive and non-rotatably retain a cutting tool, such as a router bit or the like, therewithin, with minimal force required by an operator of the driving device.

SUMMARY OF THE INVENTION

The present invention is intended to provide a keyless tool receiver or chuck, which is adaptable for use with a powered driving device or driver, such as a router or the like. The tool receiver is biased in an engaged position by a biasing member, whereby an operator may insert a cutting tool or bit within the receiver or release the tool therefrom by overcoming the biasing force of the biasing member. The tool receiver includes a plurality of blades which are biased in the engaged position whereby the blades contact a conical surface of the driver along one side and the cutting tool along the other side. The blades preferably have specific design ratios to further enhance the gripping of the tool by the tool receiver.

According to an aspect of the present invention, the tool receiver is adapted to non-rotatably secure a tool at a driving device. The tool receiver is positioned within a tapered or conical surface of the driving device. The conical surface has a narrow end and a wide end opposite the narrow end. The tool receiver comprises a plurality of blades and a biasing member. The blades are positionable in a generally circular manner at the conical surface and define a generally circular opening. The biasing member is adapted to bias the blades toward the narrow end of the conical surface such that the blades are biased in the retaining position by the biasing member. The blades are adapted to non-rotatably secure a tool with respect to the blades and the conical surface. Preferably, the tool receiver further includes a retaining member which retains the blades and preferably biases the blades radially outward toward the conical surface.

In one form, each of the blades has a thickness and a radial length. A ratio of the thickness to the radial length of each blade is preferably no greater than a coefficient of friction between each of the blades and the cutting tool. Preferably, a ratio of an effective contact width of the blades to the radial length of the blades is less than the coefficient of friction between each of the blades and the cutting tool. Each of the plurality of blades has a tool engaging surface and a cone engaging surface opposite the tool engaging surface. The tool engaging surfaces are adapted to engage a shaft of the tool, while the cone engaging surfaces are adapted to engage the conical surface of the driving device. Preferably, the tool engaging surface of each blade has a thickness which is greater than a thickness of the cone engaging surface of the blade. Preferably, the tool receiver further includes a positive stop member which is adapted to limit insertion of the tool within the circular opening defined by the blades.

According to another aspect of the present invention, a tool receiver for non-rotatably securing a tool to a driving device comprises a plurality of blades, a conical member and a biasing member. Each of the blades has a tool engaging surface and a cone engaging surface opposite the tool engaging surface. The conical member at least partially encases the blades and biases the blades radially inward toward a circular opening defined by the tool engaging surfaces of the blades. The conical member defines a tapered or conical surface which has a narrow end and a wide end opposite the narrow end. The conical member is rotatably drivable by the driving device. The blades are positionable in a generally circular manner within the conical member whereby the tool engaging surfaces of blades define a generally circular opening. The cone engaging surfaces engage the conical surface of the conical member. The biasing member biases the blades toward the narrow end of the conical surface such that the blades are biased in a retaining position by the biasing member and the conical member. The tool receiver is adapted to non-rotatably secure the tool with respect to the blades and the conical member at the tool engaging surfaces of the blades.

Preferably, the tool retainer includes a retaining member which retains the blades in the generally circular manner within the conical member. The retaining member is flexible to allow pivotal movement of the blades within the conical member with respect to the tool and the conical member. The pivotal movement is limited by the tool engaging surfaces engaging the tool and the cone engaging surfaces engaging the conical member, since a diagonal radial dimension of the blades is greater than the distance between the tool and the conical surface, which further limits rotation of the tool relative to the blades. Preferably, the retaining member biases the plurality of blades radially outward toward the conical member. Preferably, the biasing member is releasable to allow the blades to move toward the wide end of the conical surface, such that the tool engaging surfaces define a larger opening for receiving a tool therewithin or for releasing a tool that is already positioned within the opening. Preferably, the biasing member is releasable via a lever, which is movable to overcome the biasing force of the biasing member.

According to another aspect of the present invention, a tool receiver for non-rotatably securing a tool therewithin comprises a plurality of blades and a conical member. Each of the plurality of blades has a thickness and a radial length extending radially from a generally circular opening defined by the plurality of blades. The conical member is adapted to be rotatably driven by the driving device. The conical member at least partially encases the blades and biases the blades radially inward such that when a tool is positioned at the opening, the plurality of blades are adapted to engage the conical member and the tool. A ratio of the thickness to the radial length of the blades is no greater than a coefficient of friction between each of the plurality of blades and the tool. Preferably, a ratio of the distance between a point of contact of the blade on the tool and a line between the pivot point and tool center to the radial dimension from the contact point and the pivot point is less than approximately the coefficient of friction between the blade and the tool.

In one form, the tool receiver further includes a biasing member which biases the blades in an engaging position whereby the blades are adapted to non-rotatably retain the tool within the conical member. Preferably, the tool receiver further includes a retaining member which retains the blades within the conical member and biases the blades radially outward toward the conical member.

Therefore, the present invention provides very high grip strengths which require relatively low actuating forces and thus facilitates removal and replacement of tools without the use of accessory wrenches or keys. The biasing member biases the tool receiver in an engaged position such that when a tool is inserted within the receiver, the operator only has to release the biasing member to lock the tool within the receiver. The gripping blades lock the workpiece or tool in a manner so that higher loads on the tool caused by its working action result in naturally higher gripping forces. Because of the design ratios involved, it is possible to initiate the gripping action with relatively small forces, thus obviating the need for tightening wrenches. Preferably, the current design limits the contact zone of the blades to the conical surface to also overcome the tendency of the blades to skew in the gripping cone and thus protects the geometry and force system.

These and other objects, purposes, advantages and features of this invention will become apparent upon review of the following specification in conjunction with the drawings.

BRIEF DESCRIPTION OF THE DRAWINGS

FIG. 5 is a side elevation of a blade useful with the present invention;

FIG. 6 is an end elevation of the blade of FIG. 5;

FIGS. 7A–7E are end elevations of alternate blades designs which are useful with the present invention;

FIG. 7F is an end elevation of a blade useful with the present invention as it engages a conical surface of the driving device and a cutting tool;

FIG. 8 is an end elevation of a retainer useful with the present invention;

FIG. 9 is a sectional view of the retainer, taken along the line IX—IX in FIG. 8;

FIG. 13 is a perspective view of a blade useful with the present invention; and

FIG. 14 is a perspective view of a cone engaging surface of a blade useful with the present invention.

DESCRIPTION OF THE PREFERRED EMBODIMENTS

Figure 1:
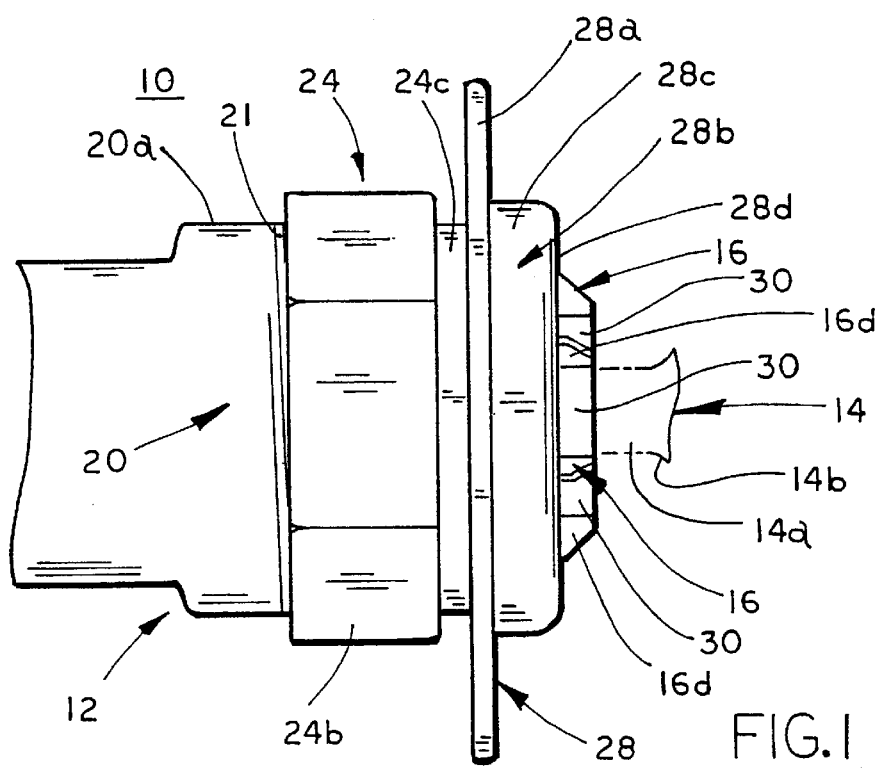
FIG. 1 is a side elevation of a tool receiver in accordance with the present invention as mounted on a driving device.
Figure 3:
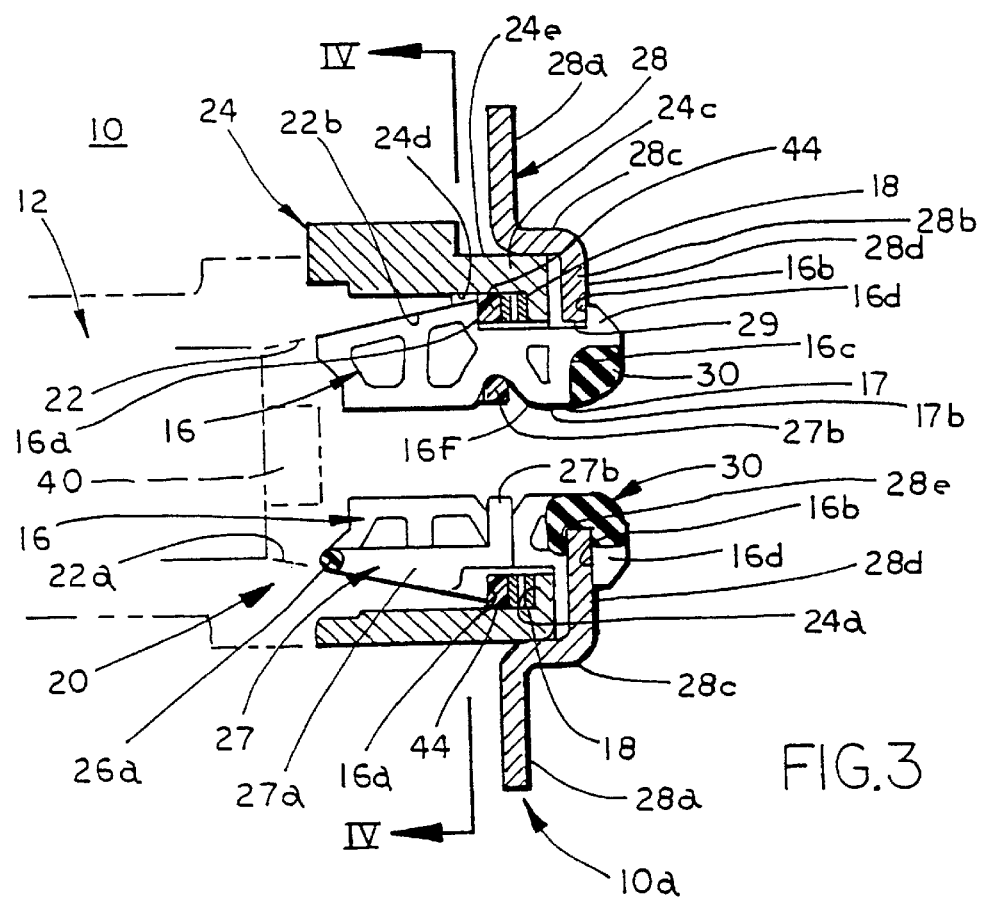
FIG. 3 is a sectional view of the tool receiver taken along the line III—III in FIG. 4.

Referring now specifically to the drawings and the illustrative embodiments depicted therein, a tool receiver or chuck 10 is mounted to a driving device 12 and functions to receive a generally cylindrical shaft 14a of a cutting tool 14 therewithin (FIG. 1). Tool receiver 10 includes a plurality of blades 16 and a biasing member 18 (FIG. 3), which biases the blades in an engaged position for non-rotatably securing the tool 14 within tool receiver 10. The driving device 12 includes a conical portion or tapered or conical member 20, which defines a conical or tapered surface 22 therewithin (FIG. 3). Conical surface 22 includes a narrow end 22a and a wider end 22b opposite narrow end 22a. Conical portion 20 is rotatably driven by driving device 12. Conical surface 22 functions to bias blades 16 radially inward toward and into engagement with shaft 14a of tool 14 in response to biasing member 18 biasing the blades 16 toward narrow end 22a of conical surface 22. Driving device 12 may be any known rotatably driven device, such as a drill, router or the like. The tool receiver of the present invention is especially applicable to driving devices which drive tools or bits which have a specific and narrow diameter range. Preferably, tool receiver 10 includes six blades 16 positioned and spaced uniformly about the conical surface. However, more or less blades may be implemented, without affecting the scope of the present invention.

Tool receiver 10 may be mounted to a conventional driving device 12 via any known means. Tool receiver 10 includes a body portion 24 which may readily engage an outer surface 20a of conical member 20 to secure tool receiver 10 to driving device 12 (FIGS. 1 and 3). Body member 24 is a generally hollow member and includes a hexagonal nut portion 24b and may include an outer cylindrical portion 24c. Nut portion 24b is securable to driving device 12, such as via threaded engagement of the nut portion to a threaded portion 21 of the driving device. Cylindrical portion 24c of body member 24 extends longitudinally outwardly from nut portion 24b and driving device 12 and defines an inner cylindrical surface 24d which extends longitudinally from outer or wider end 22b of conical surface 22 of conical member 20. Body member 24 also provides an annular reaction surface 24a positioned at an outer end of cylindrical surface 24d and radially inward from cylindrical portion 24c for engagement with biasing member 18, as discussed below.

Biasing member 18 is positioned between reaction surface 24a of body 24 and a spacer or washer 44, and functions to exert a force to push spacer 44 longitudinal inwardly along surface 24d toward narrow end 22a of conical surface 22. Biasing member 18 may comprise any known biasing means, such as coil spring 18 or a conical washer 118 (FIG. 11), wave washer, finger spring, or any other means for providing a biasing force between reaction surface 24a of body 24 and spacer 44. The spring force exerted by biasing member 18 may be selected for the particular application of tool receiver 10. The force selected must be sufficient to move the blades 16 into the engaging or operative position and countermand the axial effect of the centrifugal force acting on the blades when the driving device is operated, while being low enough to allow an operator to overcome the biasing force to release the tool from the blades, as discussed in detail below.

Spacer 44 comprises a flat, circular ring or washer which is positioned around blades 16 and between a biasing surface 16a of blades 16 and biasing member 18. An outer edge or surface of spacer 44 slides within and along inner cylindrical surface 24d of cylindrical portion 24c of body member 24, to guide the longitudinal movement of blades 16 along conical surface 22 of driving device 12.

Figure 2:
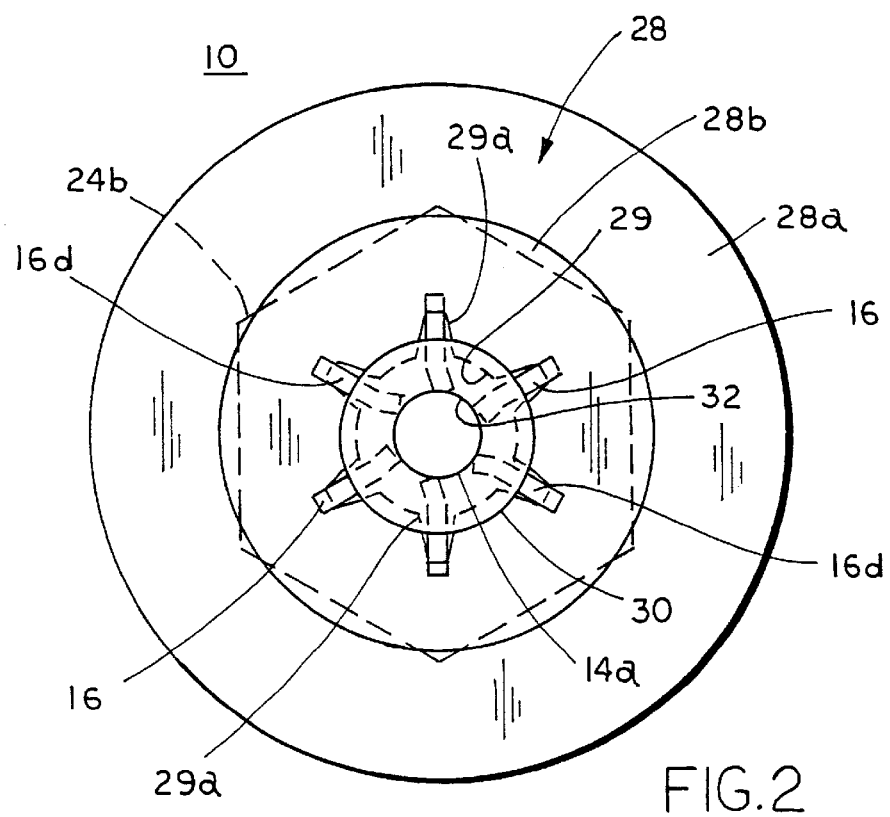
FIG. 2 is an end elevation of the tool receiver of FIG. 1.

Tool receiver 10 further includes a pull ring or releasing member 28, which is positioned at an outer end 10a of tool receiver 10 and engages a releasing surface 16b of each of blades 16. Releasing member 28 is longitudinally movable with respect to body 24. As best shown in FIGS. 1–3, pull ring 28 includes an outer ring 28a and an inner cap 28b. Cap 28b includes a longitudinally extending portion 28c which is slidable along an outer surface 24e of cylindrical portion 24c of body member 24. Longitudinally extending portion 28c may be cylindrical to uniformly engage cylindrical portion 24c of body member 24, or may otherwise be correspondingly formed with portion 24c. For example, both portion 24c and portion 28c may comprise a hexagonal or other non-cylindrical form, to allow longitudinal movement of releasing member 28 along body member 24, while also limiting rotation of releasing member 28 relative to body member 24, without affecting the scope of the present invention. Preferably, cap 28b defines an opening 29 at a center region thereof. As best seen in FIG. 2, opening 29 is generally circular and preferably includes a plurality of tapered slots 29a for receiving an outer end 16d of blades 16, in order is assist in alignment of the blades 16 within tool receiver 10. When inserted in slots 29a, releasing surfaces 16b of blades 16 engage an outer surface 28d of pull ring 28, such that longitudinal movement of pull ring or releasing member 28 in an outward direction away from body 24 and driving device 12 causes a corresponding longitudinally outward movement of blades 16 toward wider end 22b of conical surface 22 and against the biasing force of biasing member 18 via spacer 44, thereby releasing the tool from blades 16, as discussed in detail below.

Referring now to FIGS. 5 and 6, each of blades 16 includes a cone engaging surface or edge 17a and at least one tool engaging surface or edge 17b. Cone engaging surface 17a is angled relative to tool engaging surface 17b and corresponds generally to the angle of conical surface 22 of conical member 20, such that cone engaging surface 17a may uniformly engage conical surface 22, while tool engaging surface 17b of each blade 16 is oriented generally parallel with the tool engaging surfaces of the other blades. However, blades 16 may be otherwise curved along cone engaging surfaces 17a to engage conical surface 22 at a desired point or region of blades, depending on the application. Optionally, cone engaging surface 17a of blades 16 may be otherwise formed to cooperate with conical surface 22 in an optimal manner, whereby the surfaces 17a of the blades are formed to correspond with the way the conical surface changes. For example, the cone engaging surfaces 17a may be tapered or angled to provide a more uniform gripping action between the blades and the tool shaft as the blades pivot. Preferably, the surfaces 17a are formed relative to the conical surface such that the blades provide a linear edge of engagement with the conical surface along the entire length of the cone engaging surfaces 17a of blades 16, as the blades pivot during operation of the driving device. As shown in FIG. 14, this may be accomplished by forming the cone engaging surface 17a with a tapered edge which provides a central edge or peak surface 17f at one end (which is positioned toward the narrow end of the conical surface) and a flattened portion 17g at the opposite end of the cone engaging surface (toward the larger end of the conical surface). The surfaces may be further curved or rounded, without affecting the scope of the present invention. A diagonal radial dimension R (FIG. 6) of blades 16 is selected which is greater than the distance between a tool shaft and the conical surface. Therefore, as the tool resists rotation, the opposite surfaces of each blade are in contact with and wedged between the conical surface and the tool shaft, in order to securely grip the tool within the tool receiver, as discussed in detail below.

Preferably, tool engaging surface 17b includes a pair of tool engaging surfaces 17c and 17d. The tool engaging surfaces 17c and 17d are preferably angled or flared in opposite directions with respect to one another, so as to engage shaft 14a of tool 14 and prevent relative rotation of shaft 14a in either direction. Preferably, one tool engaging surface 17d, such as the inner surface is angled such that normal rotation of the driving device 12 causes a leading edge 17e (FIGS. 4–6) of tool engaging surface 17d to rotate in the driven direction, thereby engaging shaft 14a and forcing shaft 14a to rotate as well. Angling of the blade in this manner substantially precludes slippage of shaft 14a with respect to blades 16 in response to the tool encountering resistance to rotation as the driving device is operating. Additionally, a second tool engaging surface 17c, such as the outer surface or edge, is angled in the opposite direction from tool engaging surface 17d, in order to prevent slippage or loosening of shaft 14a of the cutting tool 14 when resistance to rotation of the tool is not present, such as when the tool is spinning freely or the driving device has been deactivated. Preferably, tool engaging surfaces 17c and 17d are angled slightly upwardly from a horizontal plane extending along engaging surface 17b, in order to provide opposite facing surfaces which engage the shaft of the tool as it may tend to rotate in either direction, thereby further precluding slippage of the tool in either direction relative to the blades.

As shown in FIGS. 7A–7C, the blades of the present invention may have various tool engaging surfaces 17b for engaging the outer surface of the tool shaft 14a. For example, engaging surfaces 17b' may be substantially flat (FIG. 7A). Alternately, the tool engaging surfaces 17b'' may be generally squared such that the opposite angled or flared surfaces provide an oppositely raised or tapered engaging surface (FIG. 7B). Additionally, the tool engaging surface 17b'' may be curved to provide a uniform curvature between the two engaging surfaces for uniformly engaging the outer surface of the tool shaft 14a (FIG. 7C). Alternately, other edge or surface designs may be implemented, without affecting the scope of the present invention.

Preferably, blades 16 are stamped or otherwise formed of steel and may include a plurality of aperture or openings 16e therethrough, in order to reduce the mass of the blades and thus of the overall tool receiver. The blades may also be manufactured from a lighter material to further reduce the mass of the blades. By reducing the mass of the blades, the present invention thus reduces the centrifugal forces created by rotation of the blades. As shown in FIGS. 7D and 7E, the blades may be formed in various manners. For example, a blade 16' may be formed by folding the steel over, whereby one of the engaging surfaces 17d' is formed at one end of the material and the other engaging surface 17c' is formed at an opposite end of the material, such that when the material is folded over, the tool engaging surfaces are generally side by side one another (FIG. 7D). Preferably, blades 16 are formed such that the tool engaging surface or surfaces 17b has a thickness that is greater than the thickness of the cone engaging surface 17a. For example, a blade 16'' may include a narrow cone engaging surface 17a'' and a wide tool engaging surface 17c'', as shown in FIG. 7E. This provides a wide contact surface of the blade to the shaft of the tool, while providing a narrow pivot surface of the blade at the conical surface of the driving device.

Preferably, the blade dimensions are selected such that the ratio of blade thickness to a diagonal radial dimension of each blade is less than a coefficient of friction between the blade and the tool shaft. However, in order to account for curvature of the tool shaft, the ratio may be modified. More particularly, the ratio of effective contact width of the blade to radial length of the blade is preferably less than the coefficient of friction between the blades and the tool shaft. Referring to FIG. 7F, the blade dimensions are more preferably designed and selected in a manner such that the equation $D_1/D_2 < f$ is satisfied; wherein $D_1$ is defined as the distance between the point of contact S of the blade to the tool shaft and a straight line L between pivot point P and tool center C; $D_2$ is the radial dimension from the contacting point of the tool surface S to pivot point P; and f is the coefficient of friction between the blade engaging surface 17b and the tool shaft 14a. The blade to tool contact surfaces are selected and ground or otherwise formed to provide the specific rate of increase of interference between the blade and the tool shaft that is designed to be numerically less than the coefficient of friction between the materials, thereby substantially precluding the possibility of slippage of the tool shaft relative to the blades. This concept envisions rolling contact between the tool and the blades and not a static interface.

Figure 4:
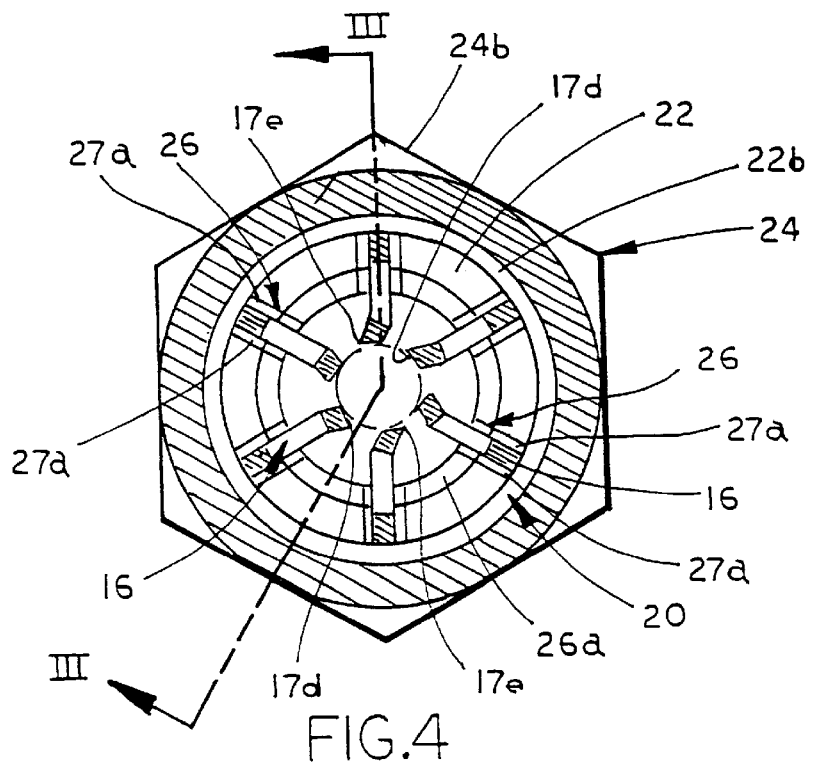
FIG. 4 is a sectional view of the tool receiver taken along the line IV—IV in FIG. 3.

Preferably, blades 16 are retained in a generally circular manner within conical member 20 by retaining member 26. As best shown in FIGS. 3, 4, 8 and 9, retaining member 26 includes a plurality of blade retainers 27 which include a pair of sidewalls 27a and a base connector 27b. Each sidewall 27a is connected to a sidewall 27a of an adjacent blade retainer 27 via a connection portion or ring 26a of retaining member 26. As shown in FIGS. 3 and 4, blades 16 are positioned within an opening 27c defined in blade retainers 27, and base connector 27b extends through a recess 16f formed along tool engaging surface 17b of each blade 16. Connecting portion 26a of retaining member 26 extends between the adjacent blade retainers 27 to maintain the blades in the proper orientation within and along conical surface 22. Alternately, portion 26a of retaining member 26 may be a complete ring at the end of the blades toward the small or narrowed end of the conical surface, without affecting the scope of the present invention.

Preferably, tool retaining member 26 comprises a semi-rigid polymeric material, such as nylon or the like, which may be molded to the desired form. Alternately, however, retaining member 26 may be formed from other materials, such as metal, plastic, rubber, or the like, without affecting the scope of the present invention. Although retainer 26 is semi-rigid, blade retaining portions 27 preferably flex or pivot relative to connecting portions 26a to allow blades 16 to pivot slightly as they are engaged between the tool and conical surface. Because retaining member 26 functions to hold the blades substantially stationary in their generally circular orientation with respect to one another, yet is at least partially deformable to allow the blades to pivot slightly as they engage the tool shaft when the driving device is actuated, the retaining member may be substantially rigid and does not have to be formed of a resilient rubber or plastic material as required by the collets of the prior art.

Preferably, tool receiver 10 further includes an outer seal portion 30 positioned around blades 16 and within a recess 16c formed in each blade 16 (FIG. 3). Seal 30 preferably comprises a rubber like material and is molded or otherwise formed to fit around each blade and around an inner surface 28e of cap 28b of pull ring 28, such that seal 30 substantially surrounds the generally circular opening 32 defined by the blades 16 (FIGS. 1–3). Seal 30 provides a resilient surface 30a for cutting tool 14 to rest against as the tool shaft 14a of the tool is inserted into tool receiver 10, while also preventing contaminants, such as dirt, shavings and the like, from entering tool receiver 10 when the driving device is in use. Outer surface 30a of seal 30 is preferably curved to engage a curved, widening portion 14b (FIG. 1) of cutting tool 14, which is common on many conventional cutting tools and/or router bits.

Tool receiver 10 may further include a stop member 40 which may be positioned at narrow end 22a of conical surface 22 (FIG. 3). Stop member 40 provides a positive mechanical stop of the shaft of the tool as the tool is inserted into tool receiver 10. The shaft 14a of the tool is thus consistently inserted in an appropriate amount, thereby eliminating uncertainty and improving the safety of the system. Alternately, or in addition thereto, seal 30 may function as a stop to engage the outer, widened end 14b of the shaft 14a of a router tool to prevent over insertion of the bit. This is a substantial improvement, since over insertion of the tool results in the outer ends of the blades engaging curved portion 14b of shaft 14a, which further results in uneven clamping of the shaft due to the wider diameter at the outer end of the shaft.

It is further envisioned that the region of contact between the blade and the conical surface at which it acts may be modified to enhance performance and/or life cycle of the tool receiver and/or the driving device. Such modifications may be desired in some circumstances, where it may not be desirable to have the blades acting directly on the conical surface because of the wear that may be caused to the conical surface. In such situations the blades or tool retainer may include a small wear pad or ring (not shown) which may be assembled to the blades and thus spread the system loads over a wide area of the conical surface, while maintaining the essential geometry of the basic invention. The wear pad or pads are preferably formed of steel or other hard and highly durable material.

When positioned within the conical member 20 of the driving device 12, blades 16 are substantially retained by retaining member 26 in their generally circular orientation. When pull ring 28 is pulled or otherwise moved longitudinally away from driving device 12, blades 16 are correspondingly moved longitudinally outwardly, such that cone engaging surfaces 17a of blades 16 are moved toward wider end 22b of conical surface 22. This allows the blades to move radially outwardly to increase the gap defined between the engaging surfaces 17b of the blades, and thus allow for insertion and/or removal of the cutting tool. Preferably, retaining member 26 functions to bias the blades 16 radially outwardly, such that as the blades slide outwardly along conical surface 22 toward wider end 22b, the blades are biased to correspondingly move radially outwardly to maintain engagement with conical surface 22. This ensures that the gap or opening 32 defined by the engaging surfaces 17b of blades 16 will increase as the blades 16 are pulled longitudinally outward from conical member 20 via longitudinal movement of pull ring 28.

When pull ring 28 is released, biasing member 18 exerts sufficient force to move blades 16 longitudinally inwardly toward narrow end 22b of conical surface 22 via spacer 44 at biasing surface 16a of blades 16, such that cone engaging surfaces 17a of blades 16 slide longitudinally inwardly along conical surface 22 toward narrow end 22a of conical surface 22. As the blades 16 slide along conical surface 22, blade engaging surfaces 17b are correspondingly moved radially inward to reduce the gap defined by the tool engaging surfaces, and thus engage the shaft of the cutting tool and clamp or secure the tool within the tool receiver 10. After tool shaft 14a is secured by tool engaging surfaces 17b of blade 16, driving device 12 may be actuated to rotate conical member 20, which correspondingly rotates body 24 and thus blades 16. As the driving device operates and the cutting tool is engaged with a work piece, the system forces increase. As cutting resistance occurs, the tool resists rotation by the blades, such that the friction force tends to pivot or rotate the blades about their opposite corners, which are in contact with the tool and the opposite conical surface. As the forces increase, the blades will further pivot to further clamp or secure the tool within the tool receiver. Accordingly, the greater the force urging the tool to slip against the blade, the greater is the resultant force which causes the blades to grip the tool and thus resist slipping. The blades are designed such that as each blade pivots, the tool engaging surface 17b clamps tighter on the tool shaft, since the tool engaging surface is preferably wider than a pivot edge along the cone engaging surface 17a, which maintains engagement with conical surface 22 as the blades 16 pivot. The diagonal dimensions of the blades thus defines the dimensional limit of the system beyond which the blades may rotate over center and lose their grip or clamp strength.

Figure 10B:
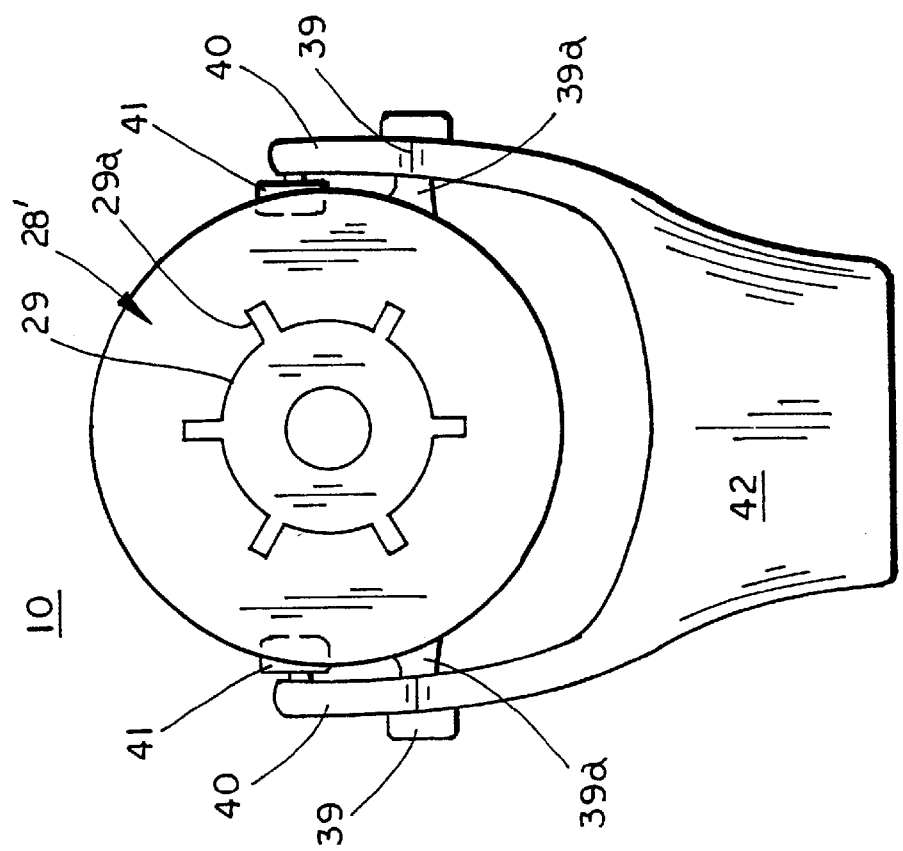
FIG. 10B is an end elevation of the tool receiver of FIG. 10A.
Figure 10A:
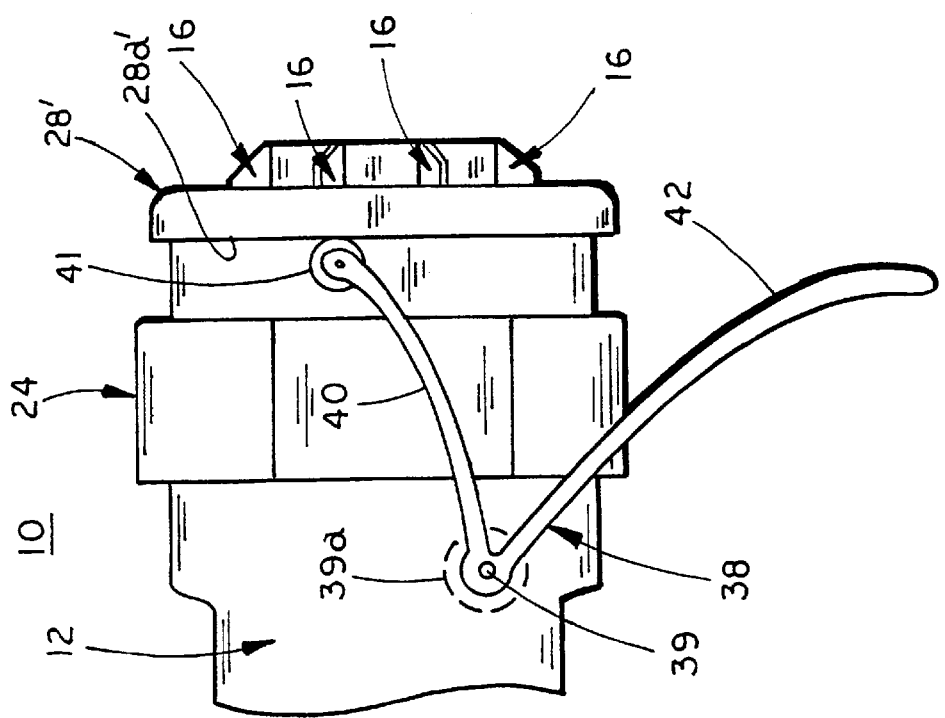
FIG. 10A is a side elevation of the tool receiver of the present invention with a lever mounted to the driving device to release the tool receiver.

As shown in FIGS. 10A and 10B, tool receiver 10 may further include a release lever 38, which provides enhanced mechanical advantage to an operator to assist in overcoming the biasing forces of biasing member 18. Lever 38 preferably includes a pair pivot points 39 at either driving device 12 or body 24, a pair of releasing arms 40, which extend from pivots 39 to a cap or pull ring 28', and a lever arm 42 extending between pivots 39 and outwardly from tool receiver 10. Preferably, releasing arms 40 include a roller 41 rotatably mounted at an outer end thereof, whereby rollers 41 engage at a roller surface 28a' of cap or pull ring 28'. Lever 38 may be pivotally mounted at pivot axes 39 to driving device 12 or body 24 at a boss or other structure 39a at driving device 12 or body 24. As lever arm 42 is moved longitudinally inwardly with respect to driving device 12 by an operator, releasing arms 40 pivot to push rollers 41 against roller surface 28a', which causes corresponding longitudinally outward movement of cap 28' and thus of blades 16, in a similar manner as discussed above. Lever 38 thus provides enhanced mechanical advantage to an operator, who may overcome the biasing forces of biasing member 18 by simply depressing lever arm 42 with one hand or even one finger or thumb. Although shown as a lever arm with rolling engagement with the cap or pull ring, clearly other levers or mechanical advantage mechanisms may be implemented to reduce the forces required to overcome the biasing member or otherwise to make the tool receiver more ergonomically accommodating. For example, a lever or handle may cause rotation of a non-circular cam which rotates to move the cap member to release the tool receiver, without affecting the scope of the present invention.

Figure 11:
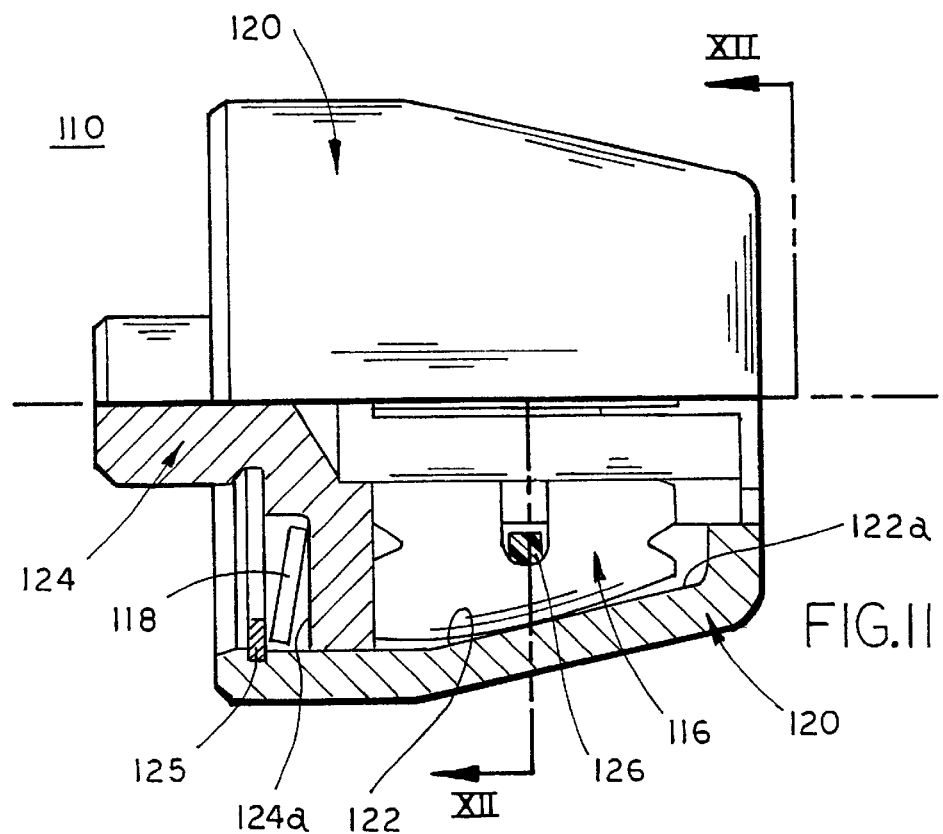
FIG. 11 is a partial sectional view of an alternate embodiment of a tool receiver in accordance with the present invention.
Figure 12:
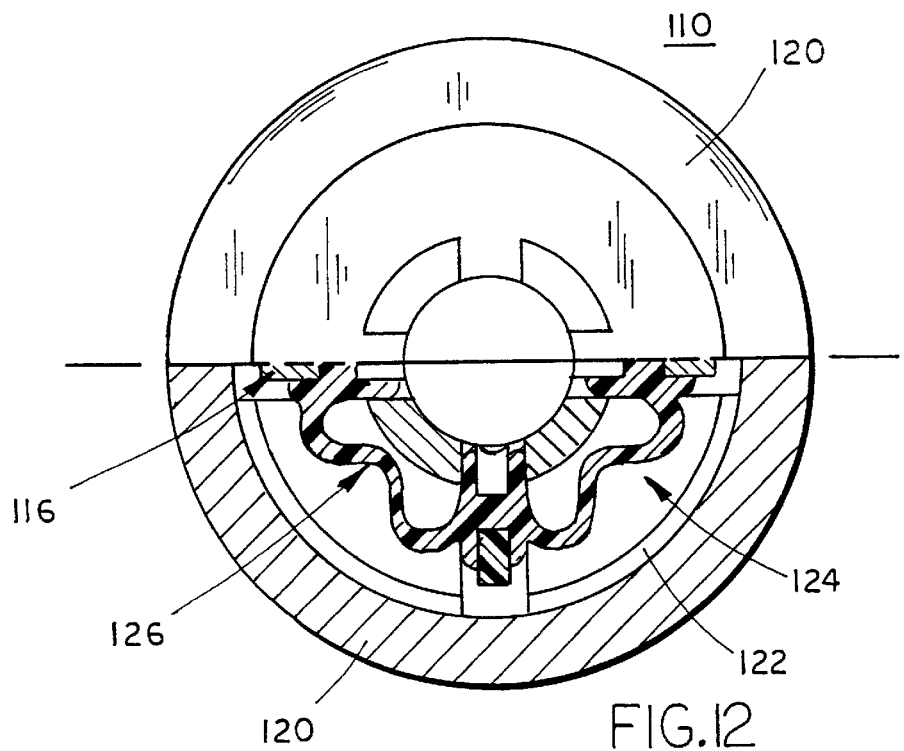
FIG. 12 is a partial sectional view taken along the line XII—XII in FIG. 11.

Referring now to FIGS. 11–13, a tool receiver 110 is mountable to a driving device (not shown) and functions to non-rotatably receive a tool shaft therewithin. The driving device is preferably a router and the tool is a routing or cutting tool or bit for cutting wood as the tool is rotated at high RPMs by the driving device. However, the tool receiver may be used with other driving devices and may receive other tools, such as drill bits or the like, without affecting the scope of the present invention. Tool receiver 110 includes a body 124 which is mountable to the driving device and rotatably drives the components of the system. Tool receiver 110 further includes a housing 120 which includes an inner conical surface 122 which forcibly engages a plurality of blades 116 to the shaft of the tool.

As discussed above with respect to tool receiver 10, blades 116 of tool receiver 110 are radially dispersed around the centerline of the system to engage the shaft of the tool uniformly around the shaft. The blades are positioned relative to one another to define a generally circular opening for receiving the tool therein. Preferably, blades 116 are substantially similar to blades 16, discussed above, such that a detailed discussion will not be repeated herein. Suffice it to say, blades 116 include a cone engaging surface 117a and at least one tool engaging surface 117b opposite the cone engaging surface. Preferably, the blades are retained in their generally circular manner by a retaining member 126, which may be substantially similar to retaining member 26, discussed above.

Housing 120 of tool receiver 110 includes a washer or ring 125 secured at one end of housing 120 toward base 124. A biasing member 118 is positioned between ring 125 and a reaction or biasing surface 124a of base 124 to bias the base 124 and thus the blades 116 toward a narrow end 122a of conical surface 122, thereby forcing blades 116 into an engaged position for engaging and clamping the shaft of a tool therebetween. Biasing member 118 may be any means for biasing, such as a conical shaped washer, which may flex to allow the system to be released, a coil spring or the like, similar to biasing member 18 discussed above. Preferably, body 124, housing 120 and blades 116 are formed of steel or the like. Similar to retaining member 26 discussed above, retaining member 126 is preferably formed of polymer material, such as nylon or the like, but may be formed of more rigid materials, such as metal or the like, without affecting the scope of the present invention.

The force system that is incorporated in the present invention is preferably dependent on the creation of a specific limiting design ratio. This limiting design ratio must exist with respect to the friction properties between the gripping blades and the tool being gripped. Simply put, the ratio of the blade thickness (t) (FIG. 13) to its radial dimension (rotational dimension) (r) (FIG. 13) is preferably less than the coefficient of friction between the blade and the tool it is gripping. However, this equation may be modified to accommodate the tool curvature, as discussed above with respect to blades 16. It is further envisioned that the ratio may vary, and may even be greater than or less than the coefficient of friction, depending on the curvature effect of the tool being gripped. Given this limiting geometric relationship, the gripping force increases until the strength or geometric stability of the system is overcome. If the ratio of blade width to radial dimension is greater than the coefficient of friction of the interface and curvature effect, then the progressive gripping force of the present invention may not occur and gripping is then based on the friction caused by the mechanical preload of the system.

Practical limits exist as to how small of a ratio of thickness to blade radial dimension can be utilized. As the system forces increase, the parts necessarily deform and the blades begin to rotate about their opposite corners. The diagonal dimension of the blades describes the dimensional limit of the system beyond which the system is unstable and loses grip strength because the blades may rotate over center. As blade thickness decreases, the cross corner dimension decreases and thus the amount of radial strain tolerance decreases. Similarly, as the radial dimensions of the blades increase, so does the tendency of the blades to buckle, and the stiffness requirement of the housing is increased, requiring disproportionately thicker components. Moreover, longer radial dimensions create larger systems and greater material requirements. It is thus preferred to reach a design compromise whereby the blade dimensional ratio remains below the friction coefficient yet the system is of appropriate and workable dimensions.

In practice there may be occasions where the torsional load on the working tool varies rapidly or even reverses direction. In order to maintain grip control over the tool in such circumstances, the present invention utilizes the design ratio principle to maintain torsional control and utilizes friction to maintain axial control of the tool. The torsional control is enhanced by providing the second tool engaging surface on the blades which is angled or flared in an opposite direction so as to maintain control or gripping of the tool when the tool reverses its rotational direction.

Therefore, the present invention provides a tool receiver for non-rotatably securing a cutting tool, such as a router bit or the like, to a driving device, such as a drill, router or the like. The tool receiver includes a biasing member which biases the receiver in an engaged position, such that the receiver may be easily used by an operator and the tool may be inserted and removed without the use of any tools or keys. The tool receiver may further include a stop member to limit axial movement of the tool within the receiver as the tool is inserted therein. The tool receiver preferably provides blades having a ratio of width to radial length which provides improved gripping of the tool by the blades as the tool resists rotation.

The tool receiver of the present invention is adaptable for tool holding applications where it is desirable to change cutting tools without the need for accessory wrenches and/or the like, and where large gripping forces are necessary. The tool receiver includes radially positioned blades which are retained by a retaining member or locating spring. The blades are preferably of prescribed dimensional relationships and circumscribed by a conical member. The conical member and/or the blades may be biased by an axial spring force to engage the conical member with the radially outward edge of the blades and thus bias the blades radially inward toward the centerline of the device. The blades may also be biased against the conical surface by the retaining member.

In order to release the tool from the tool receiver of the present invention, an operator simply applies pressure along the axis of the system in a longitudinal direction so as to collapse or otherwise overcome the biasing member or axial spring, thus allowing the retaining member to bias the blades radially outwardly from the tool, thereby releasing the tool. A releasing member or pull ring positioned along the outside diameter of the conical member preferably assists this action by providing a smooth surface to which the operator may apply force. In order to further assist the operator, a lever system may be implemented which creates a mechanical advantage in overcoming the bias spring. This lever system may be attached to the tool receiver or to the power tool on which the tool receiver is affixed.

The axial spring force is opposed by a body member which mounts the tool receiver to a suitable power tool or driving device and transmits the rotational driving force of the power tool. The driving force is transmitted to the conical member and thus to the blades. Rotation of the blades then causes corresponding rotation of the tool via the gripping action of the blades along the tool. As cutting resistance occurs, the tool resists rotation by the blades such that friction force tends to pivot or rotate the blades about their opposite corners which are in contact with the tool and the opposite conical surface. When certain dimensional ratios are maintained for the blades, the friction force causing rotation results in a camming effect which in turn results in an increase in friction force between the blades and the tool. Therefore, the greater the force urging the tool to slip against the blade, the greater is the force which causes the blade to grip the tool and resist slipping. The width and length of the blades and the diameter of the conical member are correspondingly selected such that the radial diagonal length of the blades is greater than the distance between an outer surface of the tool shaft and the inner surface of the conical member. This substantially precludes rotation of the blades beyond an effective range of operation. Alternative arrangements of the functional components can be devised to provide optimal solutions in given situations.

The present invention thus eliminates the need for loose tools, such as wrenches, spindle locks, and the like, while changing router bits and/or other cutting tools. Because the pull ring and blades only slide longitudinally with respect to the driving device, and do not require substantial tightening via threaded engagement with the driving device to secure the tool therein, the tool receiver of the present invention is less likely to seize in its locked position than are the current split collet designs of the prior art. Additionally, because the tool is moved into its locked position via releasing the receiving device, whereby the biasing member moves the blades into their locked position, the ability to securely hold the router bits is not dependent on the actions or ability of the operators, which results in improved overall safety. The present invention may be adapted for use with existing driving devices, such that the present invention is equally applicable as a retro-fit or aftermarket device and/or as an originally manufactured component of the driving device.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A tool receiver adapted to non-rotatably secure a tool at a driving device, said tool receiver being positioned within a conical surface of a driving device, the conical surface having a narrow end and a wide end opposite the narrow end, said tool receiver comprising:
   a plurality of blades which are positionable in a generally circular manner at the conical surface and are adapted to engage the conical surface of the driving device, said plurality of blades defining a generally circular opening which is adapted to receive the tool; and
   a biasing member which is adapted to bias said blades toward the narrow end of the conical surface such that said blades are biased in a retaining position by said biasing member and are adapted to non-rotatably secure a tool with respect to the said blades and the conical surface when in said retaining position, each of said plurality of blades including a tool engaging surface and a cone engaging surface opposite said tool engaging surface, said cone engaging surfaces being adapted to engage the conical surface of the driving device and said tool engaging surfaces defining said generally circular opening and being adapted to engage the tool, wherein said cone engaging surface is formed with a tapered surface therealong to cooperate with said conical surface as said blades pivot during operation of the driving device, thereby providing generally uniform engagement of said tool engaging surface with the tool.

2. The tool receiver of claim 1 further including a retaining member which retains said plurality of blades in the generally circular manner.

3. The tool receiver of claim 2, wherein said retaining member comprises a semi-rigid polymer.

4. The tool receiver of claim 3, wherein said retaining member comprises nylon.

5. The tool receiver of claim 2, wherein said retaining member biases said plurality of blades radially outwardly.

6. The tool receiver of claim 1, wherein said biasing member is deformable to allow said blades to move to a released position whereby said blades are spaced apart to receive a tool within said tool receiver.

7. The tool receiver of claim 6, wherein said biasing member is deformable via a lever.

8. The tool receiver of claim 1 further including a stop member which is adapted to limit insertion of a tool within said circular opening of said tool engaging surfaces.

9. The tool receiver of claim 1, wherein a tool is received in an opening at one of the narrow end of the conical surface and the wide end of the conical surface.

10. A tool receiver adapted to non-rotatably secure a tool at a driving device, said tool receiver being positioned within a conical surface of a driving device, the conical surface having a narrow end and a wide end opposite the narrow end, said tool receiver comprising:
   a plurality of blades which are positionable in a generally circular manner at the conical surface and are adapted to engage the conical surface of the driving device, said plurality of blades defining a generally circular opening which is adapted to receive the tool; and
   a biasing member which is adapted to bias said blades toward the narrow end of the conical surface such that said blades are biased in a retaining position by said biasing member and are adapted to non-rotatably secure a tool with respect to the said blades and the conical surface when in said retaining position, each of said plurality of blades including a tool engaging surface and a cone engaging surface opposite said tool engaging surface, said cone engaging surfaces being adapted to engage the conical surface of the driving device and said tool engaging surfaces defining said generally circular opening and being adapted to engage the tool, wherein said tool engaging surface of each of said blades comprises first and second tool engaging surfaces, said first tool engaging surface being angled in a first direction and said second tool engaging surface being angled in a second direction, said first direction being generally opposite to said second direction.

11. A tool receiver adapted to non-rotatably secure a tool at a driving device, said tool receiver being positioned within a conical surface of a driving device, the conical surface having a narrow end and a wide end opposite the narrow end, said tool receiver comprising:
   a plurality of blades which are positionable in a generally circular manner at the conical surface and are adapted to engage the conical surface of the driving device, said plurality of blades defining a generally circular opening which is adapted to receive the tool; and
   a biasing member which is adapted to bias said blades toward the narrow end of the conical surface such that said blades are biased in a retaining position by said biasing member and are adapted to non-rotatably secure a tool with respect to the said blades and the conical surface when in said retaining position, each of said plurality of blades including a tool engaging surface and a cone engaging surface opposite said tool engaging surface, said cone engaging surfaces being adapted to engage the conical surface of the driving device and said tool engaging surfaces defining said generally circular opening and being adapted to engage the tool, wherein said tool engaging surface of each of said blades has a first width and said cone engaging surface has a second width, said first width being greater than said second width.

12. A tool receiver adapted to non-rotatably secure a tool at a driving device, said tool receiver being positioned within a conical surface of a driving device, the conical surface having a narrow end and a wide end opposite the narrow end, said tool receiver comprising:

a plurality of blades which are positionable in a generally circular manner at the conical surface and are adapted to engage the conical surface of the driving device, said plurality of blades defining a generally circular opening which is adapted to receive the tool; and a biasing member which is adapted to bias said blades toward the narrow end of the conical surface such that said blades are biased in a retaining position by said biasing member and are adapted to non-rotatably secure a tool with respect to the said blades and the conical surface when in said retaining position, wherein each of said blades has a thickness and a radial length, a ratio of said thickness to said radial length being no greater than a coefficient of friction between each of said plurality of blades and the tool.

13. The tool receiver of claim 12, wherein each of said plurality of blades includes a tool engaging surface and a cone engaging surface opposite said tool engaging surface, said cone engaging surfaces being adapted to engage the conical surface of the driving device and said tool engaging surfaces defining said generally circular opening and being adapted to engage the tool.

14. A tool receiver adapted to non-rotatably secure a tool at a driving device, said tool receiver being positioned within a conical surface of a driving device, the conical surface having a narrow end and a wide end opposite the narrow end, said tool receiver comprising:

a plurality of blades which are positionable in a generally circular manner at the conical surface and are adapted to engage the conical surface of the driving device, said plurality of blades defining a generally circular opening which is adapted to receive the tool; and a biasing member which is adapted to bias said blades toward the narrow end of the conical surface such that said blades are biased in a retaining position by said biasing member and are adapted to non-rotatably secure a tool with respect to the said blades and the conical surface when in said retaining position, wherein each of said blades has a radial length and is formed such that a ratio of an effective contact width of said blade with said conical surface to said radial length is no greater than a coefficient of friction between each of said plurality of blades and the tool.

15. The tool receiver of claim 14, wherein the dimensions of said blades satisfy the equation:

$$D_1/D_2 < f;$$

wherein $D_1$ is the distance between a point of contact of said blade to the tool and a straight line between a pivot point of said blade at said conical surface and a tool center line; $D_2$ is the radial dimension from the point of contact to the pivot point; and f is the coefficient of friction between said blade and the tool.

16. A tool receiver for non-rotatably securing a tool to a driving device, said tool receiver comprising:

a plurality of blades, each of said plurality of blades having a tool engaging surface and a cone engaging surface opposite said tool engaging surface;

a conical member at least partially encasing said plurality of blades and biasing said plurality of blades radially inwardly, said conical member defining a conical surface having a narrow end and a wide end opposite the narrow end, said conical member being rotatably drivable by the driving device, said plurality of blades being positionable in a generally circular manner within said conical member whereby said tool engaging surfaces of said plurality of blades define a generally circular opening, said cone engaging surfaces of said blades engaging said conical surface of said conical member; and a biasing member which biases said blades toward said narrow end of said conical surface such that said blades are biased in a retaining position by said biasing member and said conical member and are adapted to non-rotatably secure a tool with respect to said blades and said conical member at said tool engaging surfaces, wherein each of said plurality of blades has a width and a radial length, a ratio of said width to said radial length being no greater than a coefficient of friction between said plurality of blades and the tool.

17. The tool receiver of claim 16, wherein said blades are pivotable within said conical member with respect to the tool and said conical member, said tool engaging surfaces being engagable with the tool while said cone engaging surfaces engage said conical member, thereby limiting pivotal movement of said plurality of blades relative to said conical member and further limiting rotation of the tool relative to said plurality of blades.

18. The tool receiver of claim 17 further including a retaining member which retains said blades in the generally circular manner within said conical member, said retaining member being flexible to allow pivotal movement of said blades.

19. The tool receiver of claim 16 further including a retaining member, said plurality of blades being interconnected by said retaining member, said retaining member biasing said plurality of blades radially outwardly toward said conical member.

20. The tool receiver of claim 19, wherein said biasing member is releasable to allow said blades to move toward said wide end of said conical surface, said retaining member biasing said blades radially outwardly whereby said tool engaging surfaces define a larger opening for receiving a tool therein when said biasing member is released.

21. The tool receiver of claim 20, wherein said biasing member is releasable via a lever which is movable to overcome the biasing force of said biasing member.

22. A tool receiver for non-rotatably securing a tool to a driving device, said tool receiver comprising:

a plurality of blades, each of said plurality of blades having a tool engaging surface and a cone engaging surface opposite said tool engaging surface;

a conical member at least partially encasing said plurality of blades and biasing said plurality of blades radially inwardly, said conical member defining a conical surface having a narrow end and a wide end opposite the narrow end, said conical member being rotatably drivable by the driving device, said plurality of blades being positionable in a generally circular manner within said conical member whereby said tool engaging surfaces of said plurality of blades define a generally circular opening, said cone engaging surfaces of said blades engaging said conical surface of said conical member; and a biasing member which biases said blades toward said narrow end of said conical surface such that said blades are biased in a retaining position by said biasing member and said conical member and are adapted to non-rotatably secure a tool with respect to said blades and said conical member at said tool engaging surfaces, wherein each of said blades has a radial length and is formed such that a ratio of an effective contact width of said blade with said conical surface to said radial length is no greater than a coefficient of friction between each of said plurality of blades and the tool.

23. The tool receiver of claim 22, wherein the dimensions of said blades satisfy the equation:

$$D_1/D_2 < f;$$

wherein $D_1$ is the distance between a point of contact of said blade to the tool and a straight line between a pivot point of said blade at said conical surface and a tool center line; $D_2$ is the radial dimension from the point of contact to the pivot point; and f is the coefficient of friction between said blade and the tool.

24. A tool receiver adapted for mounting to a rotational driving device and for non-rotatably securing a tool therewithin, said tool receiver comprising:
   a plurality of blades, each of said plurality of blades having a thickness and a radial length extending radially from a generally circular opening defined by said plurality of blades; and
   a conical member which is adapted to be rotatably driven by a driving device, said conical member at least partially encasing said plurality of blades and biasing said plurality of blades radially inwardly such that when a tool is positioned at least partially within said opening defined by said plurality of blades, said plurality of blades engage said conical member and the tool, a ratio of said thickness to said radial length being no greater than a coefficient of friction between each of said plurality of blades and the tool.

25. The tool receiver of claim 24, wherein said blades contact said conical member along an effective contact width as the driving device is operated, a ratio of an effective contact width to said radial length being no greater than a coefficient of friction between each of said plurality of blades and the tool.

26. The tool receiver of claim 25, wherein the dimensions of said blades satisfy the equation:

$$D_1/D_2 < f;$$

wherein $D_1$ is the distance between a point of contact of said blade to the tool and a straight line between a pivot point of said blade at said conical member and a tool center line; $D_2$ is the radial dimension from the point of contact to the pivot point; and f is the coefficient of friction between said blade and the tool.

27. The tool receiver of claim 24 further including a biasing member which biases said blades in an engaging position whereby said blades are adapted to non-rotatably retain the tool within said conical member.

28. The tool receiver of claim 27, wherein said biasing member is releasable to allow said blades to move from the engaging position to a receiving position whereby said blades are spaced to receive a tool.

29. The tool receiver of claim 27 further including a retaining member which retains said blades within said conical member, said retaining member biasing said blades radially outwardly toward said conical member.

30. The tool receiver of claim 24, wherein said blades engage said conical member along a cone engaging surface which is tapered to cooperate with said conical member as said blades pivot during operation of the driving device.

* * * * *